J. F. & O. BROWER.
ROCKING HORSE.
APPLICATION FILED MAR. 16, 1918.

1,282,744.

Patented Oct. 29, 1918.

J. F. Brower
and O. Brower,
Inventors

UNITED STATES PATENT OFFICE.

JAMES F. BROWER AND ORA BROWER, OF LANSING, MICHIGAN.

ROCKING-HORSE.

1,282,744.

Specification of Letters Patent.

Patented Oct. 29, 1918.

Application filed March 16, 1918. Serial No. 222,917.

*To all whom it may concern:*

Be it known that we, JAMES F. BROWER and ORA BROWER, citizens of the United States, residing at Lansing, in the county of Ingham, State of Michigan, have invented a new and useful Rocking-Horse, of which the following is a specification.

The device forming the subject matter of the present invention is a rocking horse, though the invention is applicable to any rocker mounted device.

The main object of the invention is the production of a rocking horse which will travel forward as rocked.

A still further object of the invention is the provision of rollers for the rockers and means for locking the rollers against rearward movement.

A still further object of the invention is the provision of means for mounting the rollers on the rockers.

The invention further contemplates improving the general structure and enhancing the utility of a rocking horse.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1:
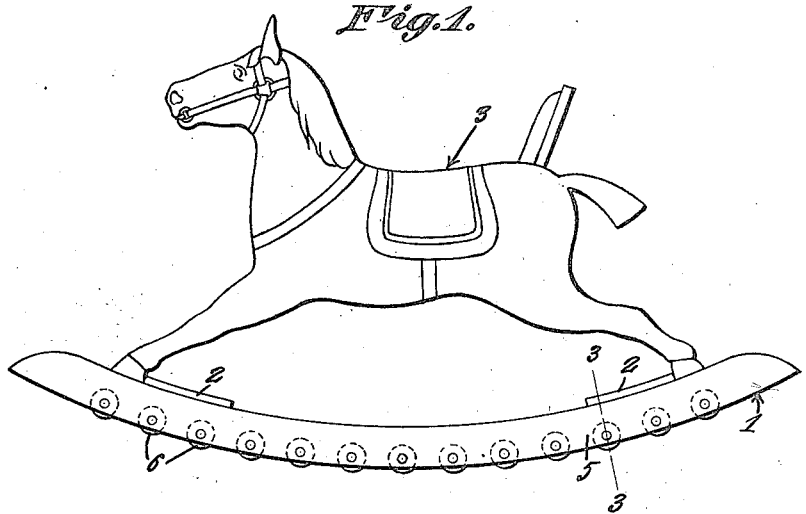
Figure 1 is a side elevation of a rocking horse constructed in accordance with the invention.
Figure 2:
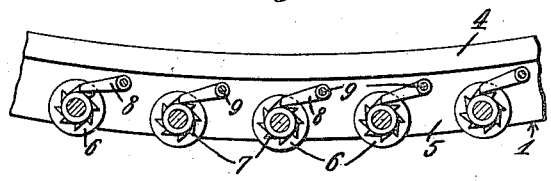
Fig. 2 is a fragmentary sectional view taken on the line 2—2 of Fig. 3.
Figure 3:
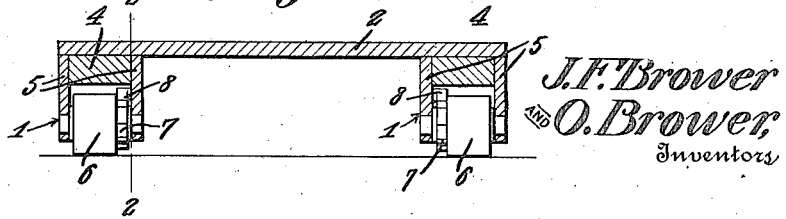
Fig. 3 is a cross section on the line 3—3 of Fig. 1.

Referring to the drawing by numerals of reference:—

In carrying out the invention there are provided parallel spaced rockers 1 which are held in position by the tie pieces 2 or otherwise. A suitable seat 3 may be provided on the rockers.

Each rocker is composed of a curved bar 4 to which are secured the side pieces 5, the whole defining a channel opening downwardly. Within the channel thus formed are arranged the spaced rollers 6, the pintles of which are journaled in the side pieces 5.

Rigid on the pintle of each roller 6 is a ratchet wheel 7 engaged by a dog or pawl 8, which pawl is pivotally mounted on a pin 9 secured in a side piece 5. Each ratchet wheel is so positioned that it will be held by its pawl against rotation when the rocker is rocked forward, but will be free to turn when the rocker is rocked backward. The backward rocking of the rocker with the rollers free to turn will cause the rockers to travel forward upon the rollers.

Having thus described the invention, what is claimed as new and sought by Letters Patent, is:—

1. In the device described, a pair of rockers, rollers journaled in and spaced longitudinally of the rockers, means for locking the rollers against rotation in one direction, and a seat mounted on the rockers.

2. The device described, including a pair of longitudinally channeled rockers, spaced rollers in the channels and journaled in the rockers, means for locking the rollers against rotation in one direction, and a seat mounted on the rockers.

3. The device described, including a pair of longitudinally channeled rockers, spaced rollers in the channels and journaled in the rockers, ratchet wheels rigid with the rollers, pawls engaging the ratchet wheels to lock the rollers against rotation in one direction, and a seat mounted on the rockers.

In testimony that we claim the foregoing as our own we have hereto affixed our signatures in the presence of two witnesses.

JAMES F. BROWER.
ORA BROWER.

Witnesses:
ALTA R. SHERMAN,
W. F. CAIRNS.